United States Patent
Kirchhoff et al.

(10) Patent No.: US 12,049,292 B1
(45) Date of Patent: Jul. 30, 2024

(54) SYSTEM AND METHOD FOR CONTROLLING LOW-SPEED MARINE PROPULSION FOR OPTIMIZING FISHING

(71) Applicant: Brunswick Corporation, Mettawa, IL (US)

(72) Inventors: Thomas S. Kirchhoff, Waupaca, WI (US); Jason S. Arbuckle, Horicon, WI (US)

(73) Assignee: Brunswick Corporation, Mettawa, IL (US)

( * ) Notice: Subject to any disclaimer, the term of this patent is extended or adjusted under 35 U.S.C. 154(b) by 585 days.

(21) Appl. No.: 17/236,544

(22) Filed: Apr. 21, 2021

(51) Int. Cl.
*G01C 21/18* (2006.01)
*B63H 21/21* (2006.01)
*G05D 13/62* (2006.01)

(52) U.S. Cl.
CPC .......... *B63H 21/21* (2013.01); *G05D 13/62* (2013.01); *B63H 2021/216* (2013.01)

(58) Field of Classification Search
CPC ........ G01C 21/18; G05D 13/62; B63B 79/40; B63B 39/04; B63H 21/21; B63H 25/42; B63H 2025/026; B63H 21/216
See application file for complete search history.

(56) References Cited

U.S. PATENT DOCUMENTS

| | | | |
|---|---|---|---|
| 6,109,986 A | 8/2000 | Gaynor et al. | |
| 6,369,549 B1 | 4/2002 | Brefeld et al. | |
| 6,485,341 B1 | 11/2002 | Lanyi et al. | |
| 7,175,490 B2 | 2/2007 | Kanno et al. | |
| 7,214,110 B1 | 5/2007 | Ehlers et al. | |
| 9,555,869 B1 | 1/2017 | Arbuckle et al. | |
| 9,682,760 B1 | 6/2017 | O'Brien et al. | |
| 10,025,312 B2 | 7/2018 | Langford-Wood | |
| 10,343,758 B2 | 7/2019 | Andrasko et al. | |
| 10,723,430 B2 | 7/2020 | Raimondi | |
| 10,948,577 B2 * | 3/2021 | Snyder | G01S 15/86 |
| 10,990,622 B2 * | 4/2021 | Laster | A01K 97/00 |
| 11,000,021 B2 * | 5/2021 | Laster | A01K 85/01 |
| 11,008,076 B2 * | 5/2021 | Gordon, II | B64U 80/84 |
| 11,008,077 B2 * | 5/2021 | Bailey | G01C 21/203 |
| 11,143,758 B2 * | 10/2021 | Laster | G01S 7/6272 |
| 11,155,327 B1 * | 10/2021 | Tate | B63H 20/007 |
| 2002/0177940 A1 | 11/2002 | Suzuki et al. | |

OTHER PUBLICATIONS

Phamduy et al., Robotic Fish: Design and Characterization of an Interactive iDevice-Controlled Robotic Fish for Informal Science Education, 2015, IEEE, p. 86-96 (Year: 2015).*

(Continued)

*Primary Examiner* — McDieunel Marc
(74) *Attorney, Agent, or Firm* — Andrus Intellectual Property Law, LLP (57) ABSTRACT

One embodiment of a method of controlling low-speed propulsion of a marine vessel includes receiving user input to engage an automatic speed control mode and then, when the automatic speed control mode is engaged, receiving the user input indicating at least one of a selected lure identifier and a selected fish identifier. A desired speed parameter is then determined based on the selected lure identifier and/or the selected fish identifier. The propulsion device is then controlled to automatically maintain the desired speed parameter.

20 Claims, 4 Drawing Sheets

(56) References Cited

OTHER PUBLICATIONS

Sherry et al., Design of a Display for Alerting Cockpit Automation Function Configuration Changes, 2019, IEEE, p. 1-15 (Year: 2019).*
Sfakiotakis et al., Review of fish swimming modes for aquatic locomotion, 1999, IEEE, p. 237-252 (Year: 1999).*
Shahir et al., Mining Vessel Trajectories for Illegal Fishing Detection, 2019, IEEE, p. 1917-1927 (Year: 2019).*

* cited by examiner

|  | LURE IDENTIFIER | | | SPEED PARAMETER |
| --- | --- | --- | --- | --- |
| LURE TYPE | LURE SUBTYPE | LURE NAME | | VESSEL SPEED (mph) |
| SPOON | | | | 2.4 |
| SPOON | WEEDLESS | | | 2.6 |
| SPOON | TROLLING | | | 2.4 |
| | | DARDEVLE | | 2.4 |
| | | DARDEVLE FIVE OF DIAMONDS | | 2.4 |
| | | THOMAS LURES BUOYANT | | 2.2 |
| PLUG | | | | 2.0 |
| PLUG | CRANK BAIT | | | 2.0 |
| | | RAPALA | | 2.0 |
| | | SHAD RAP | | 1.8 |
| SPINNER | | | | 3.0 |
| SPINNER | IN-LINE | | | 3.1 |
| SPINNER | TAIL | | | 3.0 |
| | | STRIKE KING KVD FINESSE | | 3.1 |
| SOFT PLASTIC | | | | 1.7 |
| SOFT PLASTIC | SWIM BAIT | | | 2.0 |
| SOFT PLASTIC | STICK | | | 1.5 |
| | | BIOSPAWN EXOSTICK | | 1.5 |
| JIG | | | | 4.0 |
| JIG | SWIM JIG | | | 4.0 |

FIG. 3A

| FISH IDENTIFIER | | | SPEED PARAMETER |
| --- | --- | --- | --- |
| FISH TYPE | LOCATION TYPE | SEASON | VESSEL SPEED (mph) |
| BASS | | | 2.5 |
| BASS | WEEDS | | 2.4 |
| BASS | | FALL | 2.6 |
| WALLEYE | | | 1.8 |
| WALLEYE | | SUMMER | 1.7 |
| PIKE | | | 2.4 |
| PIKE | DEEP | | 2.0 |
| | SHALLOW LAKE | | 2.0 |
| | SAND BAR | SUMMER | 2.0 |

SYSTEM AND METHOD FOR CONTROLLING LOW-SPEED MARINE PROPULSION FOR OPTIMIZING FISHING

FIELD

The present disclosure generally relates to systems and methods for controlling propulsion of a marine vessel, and more particularly to systems and methods for automatically controlling propulsion speed of the marine vessel.

BACKGROUND

U.S. Pat. No. 6,485,341 discloses a method for controlling the average speed of a vehicle over a predetermined time period, or indefinitely, or distance length based on a desired average speed, measuring an actual speed, and maintaining a cumulative error determined as a function of the difference between the average speed and actual speed and the time over which the actual speed measurement was taken. Based on the cumulative total of speed-time error, a compensatory speed is calculated that will reduce the cumulative speed-time error to an acceptable tolerance range within a selected period of elapsed time. Although particularly applicable to competition situations in which an average speed is dictated for use over a particular competition course, the average speed controlling method can be used in other situations where the average speed of a vehicle must be controlled.

U.S. Pat. No. 7,214,110 discloses an acceleration control system that allows the operator of a marine vessel to select an acceleration profile to control the engine speed of a marine vessel from an initial starting speed to a final desired speed. When used in conjunction with tow sports, such as wake boarding and water skiing, the use of acceleration profile provides consistent performance during the period of time when a water skier is accelerated from a stationary position to a full speed condition.

U.S. Pat. No. 9,555,869 discloses a method for setting an engine speed of an internal combustion engine in a marine propulsion device of a marine propulsion system to an engine speed setpoint that includes determining the engine speed setpoint based on an operator demand and predicting a position of a throttle valve that is needed to achieve the engine speed setpoint. The method also includes determining a feed forward signal that will move the throttle valve to the predicted position, and after moving the throttle valve to the predicted position, adjusting the engine speed with a feedback controller so as to obtain the engine speed setpoint. An operating state of the marine propulsion system is also determined. Depending on the operating state, the method may include determining limits on an authority of the feedback controller to adjust the engine speed and/or determining whether the operator demand should be modified prior to determining the engine speed setpoint.

U.S. Pat. No. 9,682,760 discloses a method for setting an engine speed of an internal combustion engine in a marine propulsion device to an engine speed setpoint that includes receiving an operator demand from an input device and learning an adapted maximum engine speed. An engine speed setpoint is calculated by scaling the adapted maximum engine speed relative to the operator demand. The method includes predicting a position of a throttle valve of the engine that is needed to achieve the engine speed setpoint, and determining a feed forward signal that will move the throttle valve to the predicted position. A marine propulsion system has an electronic control unit that learns the adapted maximum engine speed, calculates the engine speed setpoint by scaling the adapted maximum engine speed relative to the operator demand, predicts the position of the throttle valve, and determines the feed forward signal that will move the throttle valve to the predicted position.

U.S. Pat. No. 10,343,758 discloses a method for controlling speed of a marine vessel that includes accelerating the marine vessel in response to a launch command. The method then includes holding the vessel speed at a desired vessel speed with a controller using feedback control. The controller phases in a derivative term of the feedback control in response to determining that the following conditions are true: (a) the vessel speed is within a given range of the desired vessel speed; and (b) an acceleration rate of the marine vessel is less than a given value.

U.S. Pat. No. 10,723,430 discloses a propeller propulsion system for a watercraft that includes at least one electric motor and a propeller which can be driven by the electric motor. The propeller is a surface piercing propeller. The propulsion system includes a box-like body having a side wall on which the electric motor is fixed and a cover part on which an outdrive of the surface piercing propeller is applied. The side wall and the cover part include holes through which a shaft of the motor and a shaft of the outdrive respectively pass. The box-like body includes means for transmission of motion from the drive shaft to the outdrive shaft, and the propulsion system includes means for fixing the box-like body to a transom of the watercraft.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a method of controlling low-speed propulsion of a marine vessel includes receiving user input to engage an automatic speed control mode and then, when the automatic speed control mode is engaged, receiving the user input indicating at least one of a selected lure identifier and a selected fish identifier. A desired speed parameter is then determined based on the selected lure identifier and/or the selected fish identifier. The propulsion device is then controlled to automatically maintain the desired speed parameter.

A marine propulsion system for controlling low-speed propulsion of a marine vessel includes a propulsion device having a powerhead configured to rotate a propeller to propel the marine vessel and a control system. The control system is configured to store a table associating each of at least one of a plurality of lure identifiers and a plurality of fish identifiers with a speed parameter. User input is received indicating at least one of a selected lure identifier and a selected fish identifier. A desired speed parameter is then determined from the table based on the selected lure identifier and/or the selected fish identifier. The propulsion device is then controlled to automatically maintain the desired speed parameter.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

The present inventors have recognized that it is desirable to have a user interface and control system whereby a user can control speed of the marine vessel, and particularly low-speed propulsion of the marine vessel for purposes of trolling while fishing, based on information inputted by the user relating to a type of lure or other lure information and/or a type of fish or other information relating to the type of fishing being performed. Thereby, the user can easily and intuitively select an appropriate trolling speed based on the type of fishing being performed. This may be particularly useful for electric marine drives powered by electric motors, which can be controlled at lower rotational speeds than their internal combustion counterparts, and thus can effectuate very low vessel speeds such as 1-3 miles per hour. By contrast, internal combustion powered devices cannot be operated much below idle speed, and thus decreasing the vessel speed below idle propulsion speed (often around 6-7 miles per hour) requires lowering the rotational force imparted on the propeller, such as by providing a transmission with a lower gear ratio and/or utilizing slip.

In one embodiment, the system is configured with a table associating each of at least one of a plurality of lure identifiers and a plurality of fish identifiers with a speed parameter, such as a vessel speed and/or a propulsion RPM. The propulsion RPM is a rotational speed in revolutions per minute (RPM) relating to the powerhead of the propulsion device, such as a rotational speed of the powerhead, a rotational speed of the propeller, or a rotational speed of some other element within the propulsion device driven into rotation by the powerhead.

The table is utilized to identify a selected vessel speed or a selected propulsion RPM based on user input of a selected lure identifier and/or a selected fish identifier. Namely, the system is configured to receive user input indicating at least one of a selected lure identifier and a selected fish identifier. Based on that user input, a desired vessel speed and/or desired propulsion RPM is identified and the system automatically controls one or more propulsion devices to maintain the selected vessel speed or the selected propulsion RPM. Such functionality and user interface configuration may be provided upon selection of an automatic speed control mode, such as an automatic speed control mode for fishing in particular. The mode may be engageable through a user interface device, such as via a touchscreen user interface, a keypad, or the like. Likewise, the system includes a user interface device or system that facilitates the user input indicating the selected lure identifier and/or or selected fish identifier, which may be a user interface provided at the helm of the marine vessel or by a portable computing device in wireless communication with control system(s) for the propulsion device(s).

Figure 1:
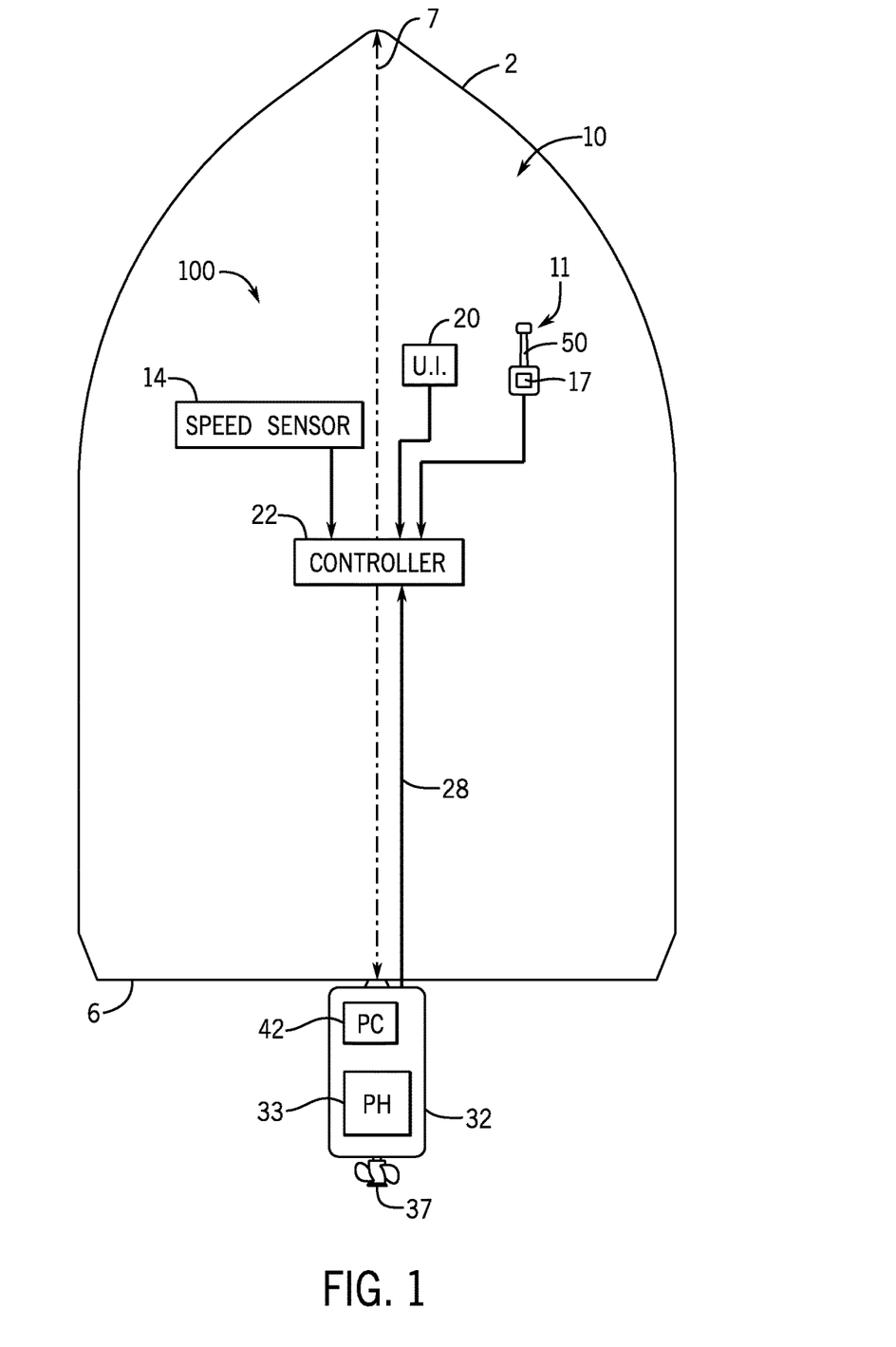
FIG. 1 depicts a marine propulsion system according to an embodiment of the present disclosure.

FIG. 1 illustrates a marine vessel 2 having a propulsion system 10 for controlling propulsion according to the present disclosure. The propulsion system 10 includes at least one propulsion device 32, and in some embodiments may include a plurality of propulsion devices configured and controlled as described herein. In the depicted embodiments, the propulsion device 32 is an outboard drive, or outboard motor, coupled to the transom 6 of the marine vessel 2. The propulsion device 32 may be an electric propulsion device containing an electric motor, a combustion-powered device containing an internal combustion engine, or a hybrid electric propulsion arrangement that contains an internal combustion engine and an electric motor. In the examples shown and described, the propulsion device 32 is a single outboard drive mounted aligned with the centerline 7; however, the concepts of the present disclosure are not limited for use with outboard drives and can be implemented with other types of propulsion devices, such as stern drives, inboard drives, etc. as well as with multi-drive systems. The propulsion device 32 is attached to the marine vessel 2 in a conventional manner such that each is rotatable about a respective vertical steering axis in order to steer the marine vessel 2. Often, the propulsion device is also rotatable about a horizontal trim axis in order to trim the propulsion devices up and down.

The propulsion device 32 includes a powerhead 33, which is a prime mover and may include a motor (such as an electric motor), an engine (such as an internal combustion engine), or a hybrid thereof. As described herein, rotational speed, or RPM, of the powerhead 33 (whether an ICE or an electric motor) is controlled to provide automated low-speed cruising of the vessel. The powerhead 33 initiates and maintains rotation of the drive shaft to thereby cause rotation of a propeller shaft having a propeller 37 at the end thereof, which will be understood as referring to a propeller or an impeller, or combination thereof. The propeller 37 is connected to and rotates with the propeller shaft, such as through a gearcase, to propel the marine vessel 2. In various embodiments, the propeller 37 may rotate at the same speed as the powerhead 33, or at a speed proportional to that of the powerhead 33, such as dependent on a gear ratio. The direction and/or ratio of rotation of the propeller 37 may be changeable by a gear system (e.g., a transmission), or in some embodiments by changing the directional rotation of the powerhead 33. The rotational direction of the propeller is typically controlled by a remote control 11 associated with the respective propulsion device 32 and/or may be automatically controlled by the control system 100. In other embodiments, the propulsion device may be a jet drive having a jet pump as the propulsor instead of a gearcase and propeller, such as on a jet boat or jet ski.

As is conventional, the remote control 11 includes a lever 50 movable by an operator into a reverse position to effectuate reverse propulsion, a neutral position that causes disassociation between the powerhead 33 and the propeller or otherwise no propulsion force, and a forward position that effectuates a forward propulsion. The remote-control lever 50 is also movable by an operator to provide throttle control, and thus thrust control, within the respective gear position. In a preferred embodiment, the remote control 11 is a drive-by-wire input device, and the position of the lever 50 sensed by the position sensor 17 will be translated into a control input to a throttle valve, for example. Such driveby-wire systems are known in the art, an example of which is disclosed at U.S. Pat. No. 9,103,287 incorporated herein by reference in its entirety.

Figure 2:
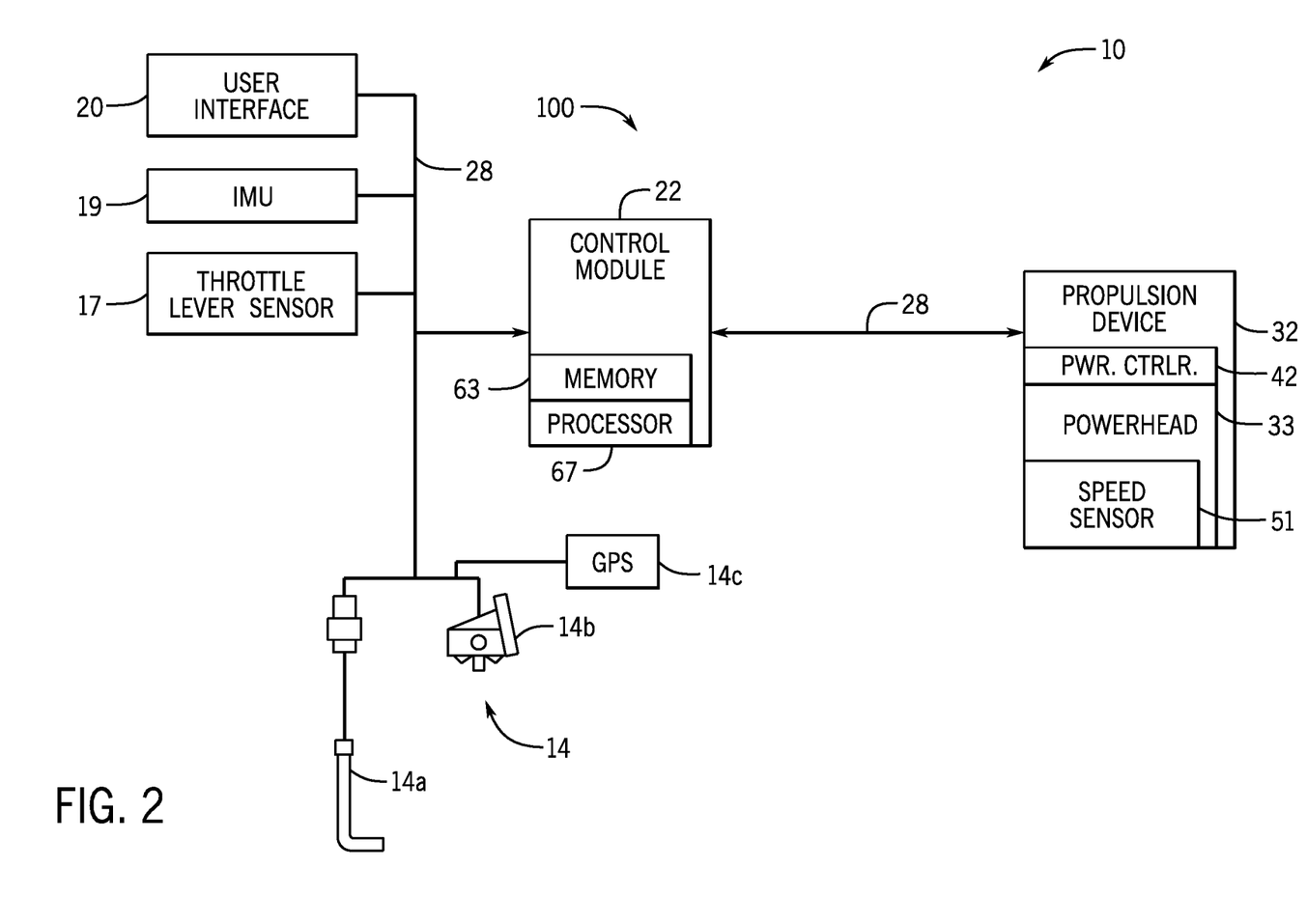
FIG. 2 is a schematic depicting another embodiment of a marine propulsion system according to the present disclosure.

Referring to FIGS. 1 and 2, the propulsion system 10 includes a control system 100 that includes one or more controllers and communication networks for effectuating automated propulsion control. Each propulsion device 32 may be associated with and controlled by a powerhead controller 42, which in exemplary embodiments may be an engine control module (ECM) or a motor controller, and a central controller 22, such as a helm control module (HCM) or command control module (CCM) communicatively connected to the powerhead controller 42. As will be understood by an ordinary skilled person, in embodiments where the powerhead 33 is an electric motor or a hybrid electric motor, the powerhead controller 42 will be configured accordingly. The connection between the central controller 22 and the powerhead controller 42 is via a communication link 28, which may be by any known means and in various embodiments could be a CAN bus for the marine vessel (such as a CAN Kingdom network), a dedicated communication bus between the respective control modules 22 and 42, a wireless communication network via Bluetooth, BLE, ZigBee, or any other wireless protocol, or via other communication means implemented for facilitating communication between electronic devices on a marine vessel.

Thereby, communication is facilitated between the controllers in the control system 100, whereby the powerhead controller 42 sends and receives parameters relating to the powerhead 33—e.g., RPM, transmission speed, throttle position (for an ICE), delivered power or current (for an electric motor), etc.—and the central controller 22 (or other central controller) can communicate control instructions—e.g., propulsion RPM, power or current, or other commands relating to the propulsion output. The central controller 22 may further be configured to carry out propulsion and vessel speed control methods, such as automatic vessel speed control, and including the methods described herein. The control system 100 arrangement depicted and described at FIGS. 1 and 2 is merely representative and various other arrangements are known and within the scope of the disclosure. For example, the control system 100 may further include additional or different controllers and/or controller types than those depicted, such as a powertrain control module (PCM) and/or a thrust vector module (TVM), as are well-known in the art. The methods described herein may be accomplished by any one controller or by cooperation of two more controllers within the control system 100 on the vessel 2.

Each of the controllers (HCMs, ECMs, motor controllers, etc.) may have a memory and a programmable processor, such as processor 67 and memory 63 in central controller 22. As is conventional, the processor 67 can be communicatively connected to a computer readable medium that includes volatile or nonvolatile memory upon which computer readable code (software) is stored. The processor 67 can access the computer readable code on the computer readable medium, and upon executing the code can send signals to carry out functions according to the methods described hereinbelow. Execution of the code allows the control system 100 to control one or more powerheads 33 and various other systems in or associated with each propulsion device 32. Processor 67 can be implemented within a single device but can also be distributed across multiple processing devices or sub-systems that cooperate in executing program instructions. Examples include general purpose central processing units, application-specific processors, and logic devices, as well as any other type of processing device, combinations of processing devices, and/or variations thereof. In the example shown, at least one central controller 22 comprises a memory 63 (such as, for example, RAM or ROM), although all of the control modules may comprise such storage.

The controller 22 may receive a rotational speed, or RPM, from the powerhead controller 42. The rotational speed may be sensed by the speed sensor 51, as is well known in the relevant art. The controller 22 may receive a vessel speed from vessel speed sensor 14. The vessel speed sensor 14 may be, for example, a pitot tube sensor 14*a*, a paddle wheel sensor 14*b*, or any other speed sensor appropriate for sensing the actual speed of the marine vessel. Alternatively or additionally, the vessel speed sensor 14 may be a GPS device 14*c* that calculates vessel speed by determining how far the vessel has traveled in a given amount of time. Alternatively or additionally, the control system 100 may receive input from a throttle lever sensor indicating throttle lever 50 position communicatively connected (e.g., via CAN bus 28) to one or more controllers 22. While the disclosed system is configured to automatically control speed of the marine vessel in the automatic speed control mode, the throttle lever position may still be utilized to provide user control inputs. For example, the throttle lever may be used to engage or disengage the automatic speed control functionality, or to increment or decrement the speed that is automatically maintained by the system. In the examples shown in FIGS. 1 and 2, the central controller 22 interprets these signals and sends commands to the one or more powerhead controllers 42.

The controller 22 may also receive inputs from an inertial measurement unit (IMU) 19 that senses a roll position, yaw position, and pitch of the vessel 2. For example, the IMU 19 may comprise a gyroscope, such as a three-axis gyroscope, to detect orientation information that may be used to determine the roll, yaw, and pitch angles of the marine vessel 2. In other embodiments, the IMU 19 may be a magnetometer, or may include any other type of position or inertial measurement unit, such as a combination accelerometer and/or gyroscope with a magnetometer.

The user interface 20 is configured to receive user inputs of lure identifiers and/or fish identifiers, and may also be configured to receive user input engaging the automatic speed control mode for fishing. In one embodiment, the user interface 20 includes a touchscreen or other display configured to display options for selection by a user, including to display a plurality of lure identifiers and/or fish identifiers for selection by the user. For instance, the user interface may be provided by a VesselView system by Mercury Marine. In certain examples, the user interface 20 may include a portable computing device, such as a cellular phone, running an application enabling communication and interaction with the controller 22. The VesselView Mobile by Mercury Marine provides one example of such a user interface system.

The user interface 20 is configured to allow user selection of one or more lure identifiers and/or fish identifiers. For example, the lure identifiers and/or fish identifiers may be provided on a selectable list, such as a drop-down menu. Alternatively, the user may input the selection by typing the lure identifier or fish identifier, or a portion thereof, into a search function, and then selecting a search result. Upon selection of a lure identifier or a fish identifier, the control system 100 determines a desired speed parameter for the marine vessel, such as a desired vessel speed or a desired propulsion RPM.

Figure 3A:
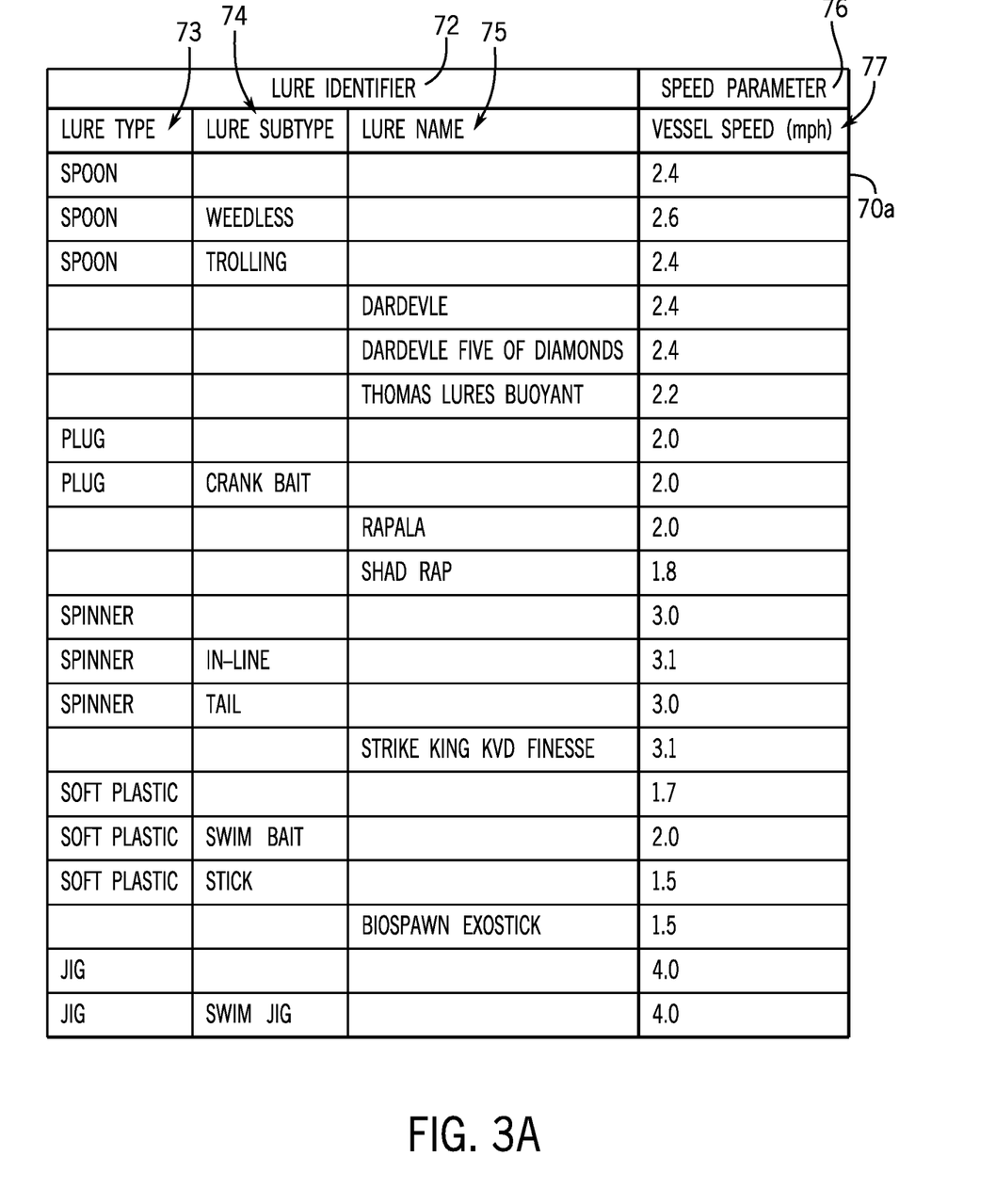
FIG. 3A depicts an exemplary table associating a plurality of lure identifiers with a speed parameter according to one embodiment of the present disclosure.
Figure 3B:
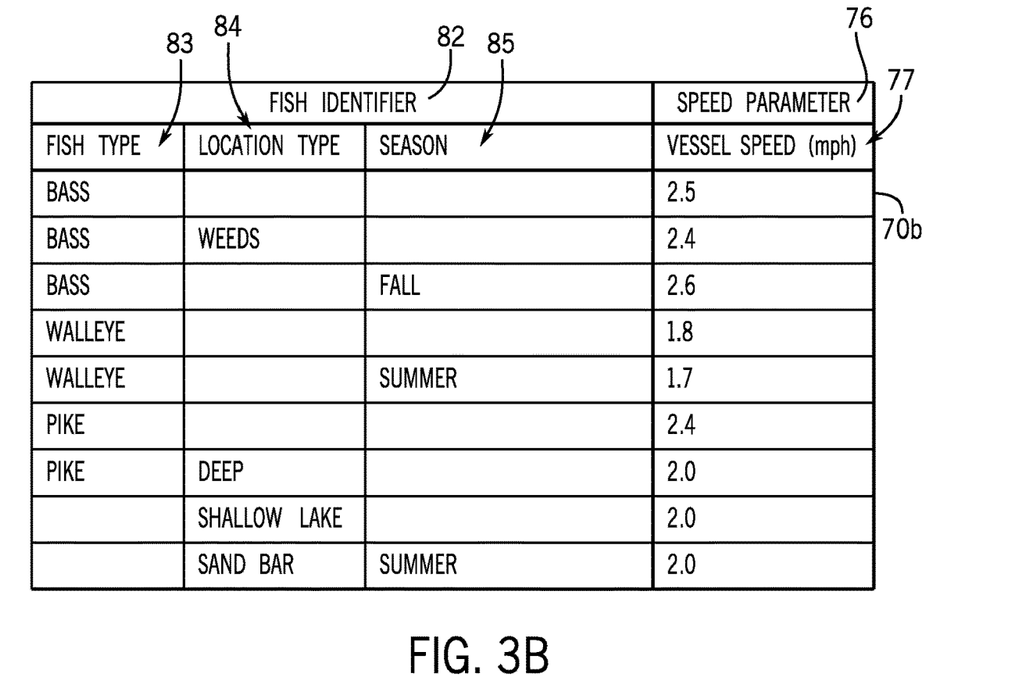
FIG. 3B depicts an exemplary table associating each of a plurality of fish identifiers with a speed parameter according to another embodiment of the present disclosure.

The desired speed parameter is determined based on the lure identifier and/or fish identifier inputted by the user, for example based on one or more tables associating lure identifiers and/or fish identifiers with respective desired speed parameters. FIGS. 3A and 3B provide exemplary tables 70a and 70b. In FIG. 3A, the exemplary table 70a associates each of a plurality of lure identifiers 72 with a desired speed parameter 76. Each lure identifier includes at least one of a lure type, a lure subtype, and a lure name. Several different types of manufactured lures are available, which are generally classified into known lure types and subtypes. Lure manufacturers sell lures under a brand name providing a source identifier for the lure, which may also include a branded lure name which identifies the particular construction of the lure offered under the brand name. Well known lure brand names include Dardevle and Rapala, to provide just a few examples. As shown in the example at FIG. 3A, the table 70a may include a plurality of lure types 73, plurality of lure subtypes 74, and a plurality of lure names 75. While the depicted example includes information under each lure identifier category, in other embodiments the table may only include one or two of the lure identifier categories. For example, another embodiment of a lure identifier table 70a may only provide desired speed parameters 76 associated with each of a plurality of lure names 75.

There are many different types of lures available for fishing, and thus the lure identifier table 70a may be configured to contain any combination of lure types 73. Exemplary lure types include spoon lure, plugs, spinners, soft plastic lures, and jigs. Each lure type has a plurality of subtypes. The lure identifier table 70a may be configured to provide desired speed parameters 76 for a plurality of lure subtypes 74. For example, spoon lures may include a plurality of lure subtypes 74 including weedless, traditional casting, trolling, surface and jigging. Plug lures include a plurality of subtypes 74 including, for example, wobbler, crankbait, shallow-diver, and deep-diver. The spinner lure type category includes a plurality of lure subtypes 74 including in-line, tail, beetle, overhead arm, and live bait spinners, to name a few. Several subtypes of the soft plastic lure type include stick bait, swim bait, worm, and lizard, to name a few. Exemplary lure subtypes 74 of the jig lure type include swim, casting, flipping, grass, and finesse jigs. Various other lure types may be included in the plurality of lure types 73 and likewise other lure subtypes may be included in each of the plurality of lure subtypes 74 beyond those listed herein, which are merely provided as examples of lure identifiers 72. Likewise, the lure identifier table 70a may include a plurality of lure names 75, examples of which are provided in FIG. 3A as explanatory examples.

A speed parameter 76 is associated with each lure identifier 72, such as each lure type, subtype, and/or lure name in the table. For example, if a user selects Daredevle, which is a lure brand name generally associated with spoon lures, a desired speed parameter is determined as the speed parameter associated with the selected daredevil lure name. Alternatively or additionally, the lure identifier table 70a may be configured to allow user selection of a specific lure name within a brand offering of lures, such as the Daredevle Five of Diamonds and/or the Thomas Lures Buoyant, where a speed parameter is associated with each such lure name. Thus, the lure identifier table 70a may be configured to receive lure identifiers 72 of various levels of specificity and to provide a speed parameter therefore. In certain embodiments, the speed parameter associated with a particular lure type may be an average or estimate based on the various lure subtypes and lure names that fall within that lure type. Similarly, the lure subtype speed parameters may be an average or estimate based on the various speed parameters for the lure names associated with the lure subtype. In other embodiments, the lure identifier table may be configured to receive only one type of lure identifier, such as to only associate lure names with respective desired speed parameters considered optimal for that particular lure name or brand.

FIG. 3B provides another embodiment of a table 70b where a plurality of fish identifiers 82 are listed and each associated with a speed parameter 76. The fish identifiers 82 may include, for example, a plurality of fish types 83, a plurality of location types 84 and/or a plurality of seasons 85. Such information may be associated with a respective speed parameter determined to be ideal for the fish behavior specified by the fish identifier 82. The plurality of fish types 83 may include, to provide just a few examples, bass, walleye, and pike. A plurality of location types 84 may specify an environment being fished, such as a depth, a type of water (fresh, salt, brackish), a water body type (e.g., lake, river, ocean), a depth or depth category (e.g., shallow or deep), or a water environment (e.g., weeds, sandbar). In still other embodiments, the plurality of location types 84 may include a geographical region. Alternatively or additionally, the fish identifiers 82 may include a plurality of seasons 85, such as spring, summer, fall, winter.

In still other embodiments, a table 70 may be configured to provide speed parameters 76 based on both lure identifiers 72 and fish identifiers 82. Thus, the table may be configured to provide a desired vessel speed or a desired propulsion RPM based on user input of any one or more of a lure type, a lure subtype, and a lure name, along with any one or more of a fish type, location type, and season. For instance, upon receipt of user input specifying Daredevle Five of Diamonds and pike, the table may be configured to provide an associated desired speed parameter that is ideal for troll fishing using the specified lure name to attract the specified fish type.

The examples at FIGS. 3A and 3B depict tables 70a and 70b where the speed parameter 76 includes a plurality of vessel speeds 77 in miles per hour (mph). However, in other embodiments, the tables 70a and 70b may be configured to provide a different speed parameter 76, which may be provided as an alternative to vessel speed or in addition to vessel speed. The speed parameter 76 may be any value associated with trolling speed and/or controlling the powerhead 33 to achieve a particular trolling condition. For example, the speed parameter may be a vessel speed in miles per hour (mph) or kilometers per hour (kph). Alternatively or additionally, the speed parameter may be a propulsion RPM, such as a rotational speed of the propeller 37 or a rotational speed of the powerhead 33 (e.g., a motor RPM or an engine RPM). In still other embodiments, the speed parameter may be associated with fuel or power provided to the powerhead 33. Where the powerhead is an electric motor, for example, the speed parameter 75 may be power or current provided to the electric motor. Where the powerhead 33 is an ICE, the speed parameter 76 may be, for instance, throttle position, gear position, slip rate, or any combination thereof.

In certain embodiments, the table 70a, 70b may be configurable by a user, where the user can populate the lure identifiers and fish identifiers, and/or adjust the associated speed parameters. Alternatively or additionally, the tables 70a, 70b may be pre-configured and populated by the software provider.

In certain embodiments, the one or more of the table(s) may be stored locally on a memory within a controller or computer operating in the control system 100. For example, the table(s) 70a, 70b may be stored on a user's portable computing device configured to communicate with the controller 22 or to another control device within the system 100. Alternatively or additionally, the table 70a, 70b may be stored remotely and accessible by the controller 22 and/or computer operating within the control system 100. For example, the table 70a, 70b may be stored in a cloud computing arrangement and may be accessed by the computer associated with the user interface 20, such as a mobile computing device communicating via cellular network to a remote computing location where the table 70a and 70b is accessed and utilized. The mobile computing device may also provide the user interface means by which a user can modify the table 70a, 70b, or the instance of the table 70a, 70b associated with that particular user.

The control system 100 is then configured to automatically control the propulsion device 32 based on the speed parameter 76 dictated by the table 70a, 70b based on the lure identifier 72 and/or fish identifier 82 selected by the user. The control system 100 may be configured to use corresponding sensor data from the powerhead speed sensor 51 and/or the vessel speed sensor 14 (or multiple vessel speed sensors 14a, 14b, and/or 14c) as feedback for the automatic control. For instance, in an embodiment where the powerhead 33 is an electric motor, the control module 22 may be configured to determine the speed parameter 76 based on the selected lure identifier and/or fish identifier, and then to command the powerhead 33 to achieve and maintain that desired speed parameter. For example, the control system 100 may command a propeller speed or a rotational speed of the powerhead 33 to maintain a desired vessel speed associated with the lure identifier and/or fish identifier. The powerhead controller 42, such as a motor controller, may then be configured to control power delivered to the electric motor powerhead 33 to achieve the commanded rotational speed.

Figure 4:
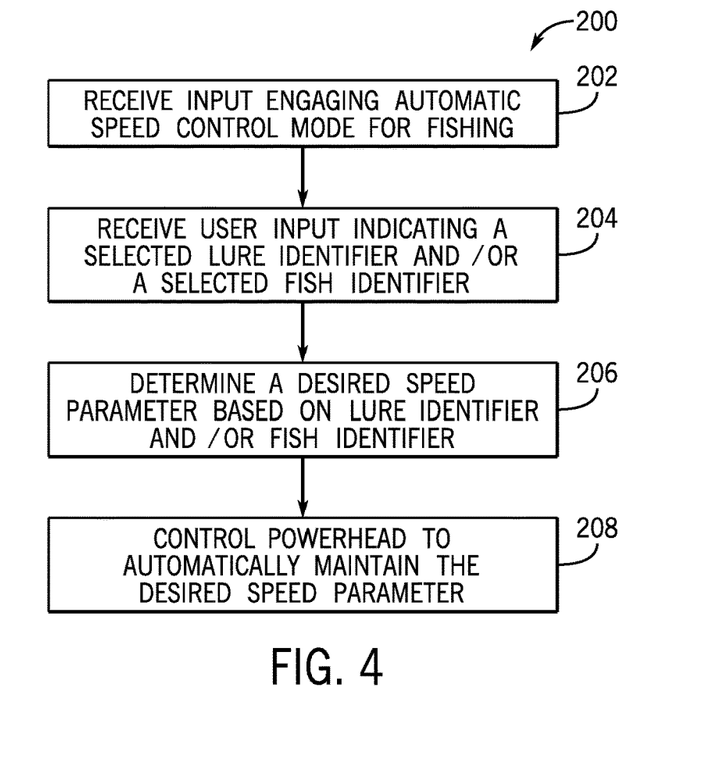
FIG. 4 is a flow diagram depicting one embodiment of a method of controlling low-speed propulsion of marine vessel according to the present disclosure.

FIG. 4 depicts one embodiment of a method 200 of controlling low-speed propulsion of a marine vessel. User input engaging an automatic speed control mode for fishing is received at step 202. Thereafter, user input is received indicating a selected lure identifier and/or a selected fish identifier, as represented by step 204. A desired speed parameter is then determined at step 206 based on the elected lure identifier and/or the selected fish identifier. For example, the desired speed parameter may be determined utilizing a table, such as that represented in FIGS. 3A and/or 3B associating each of a plurality of lure identifiers and/or a plurality of fish identifiers with respective desired speed parameter. At least one propulsion device, including a powerhead thereof, is then controlled at step 208 to automatically maintain the desired speed parameter. For example, the automatic maintenance of the desired speed parameter may rely on feedback provided by one or more speed sensors, such as a rotational speed sensor associated with the powerhead 33 and/or the propeller 37, or a vessel speed sensor 14.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of controlling low-speed propulsion of a marine vessel, the method comprising:
    receiving a user input to engage an automatic speed control mode;
    when the automatic speed control mode is engaged, receiving a user input indicating at least one of a selected lure identifier and a selected fish identifier;
    determining, with a control system on the marine vessel, a desired speed parameter based on the selected lure identifier and/or the selected fish identifier; and
    controlling a propulsion device with the control system to automatically maintain the desired speed parameter.

2. The method of claim 1, further comprising storing a table associating each of at least one of a plurality of lure identifiers and a plurality of fish identifiers with a speed parameter, and wherein determining the desired speed parameter includes locating the speed parameter associated in the table with the selected lure identifier and/or the selected fish identifier.

3. The method of claim 2, wherein the speed parameter is a vessel speed.

4. The method of claim 3, wherein the table associates each of the plurality of lure identifiers with a respective desired vessel speed.

5. The method of claim 2, wherein the speed parameter is one of a rotational speed of a propeller and a rotational speed of a powerhead of the propulsion device.

6. The method of claim 5, wherein the table associates each of the plurality of lure identifiers with a respective desired propulsion RPM.

7. The method of claim 2, wherein the table associates each of the plurality of fish identifiers with the speed parameter, wherein each fish identifier includes at least one of a fish type, a location type, and a season.

8. The method of claim 7, wherein at least one of the plurality of fish identifiers includes two or more of the fish type, the location type, and the season.

9. The method of claim 7, wherein the speed parameter is at least one of a vessel speed and a propulsion RPM.

10. The method of claim 1, wherein the selected lure identifier includes at least one of a lure type, a lure subtype, and a lure name.

11. The method of claim 10, wherein the lure name includes a brand name identifying a fishing lure or group of fishing lures.

12. A marine propulsion system for controlling low-speed propulsion of a marine vessel, the system comprising:
    a propulsion device having a powerhead configured to rotate a propeller to propel the marine vessel;
    a control system configured to:
        store a table associating each of at least one of a plurality of lure identifiers and a plurality of fish identifiers with a speed parameter;
        receive a user input indicating at least one of a selected lure identifier and a selected fish identifier;
        determine, from the table, a desired speed parameter based on the selected lure identifier and/or the selected fish identifier; and control the powerhead to automatically maintain the desired speed parameter.

13. The system of claim 12, wherein each lure identifier includes at least one of a lure type, a lure subtype, and a lure name.

14. The system of claim 13, wherein at least one of the plurality of lure identifiers includes a lure name being a brand name of a lure.

15. The system of claim 12, wherein the speed parameter and the desired speed parameter are at least one of a vessel speed and a propulsion RPM.

16. The system of claim 15, wherein the propulsion RPM is one of a rotational speed of the propeller and a rotational speed of the powerhead.

17. The system of claim 13, wherein the speed parameter is vessel speed such that the table associates each of the plurality of lure identifiers with a respective desired vessel speed.

18. The system of claim 13, wherein the speed parameter is propulsion RPM such that the table associates each of the plurality of lure identifiers with a respective desired propulsion RPM.

19. The system of claim 12, wherein the table associates each of the plurality of fish identifiers with a respective desired vessel speed or a respective desired propulsion RPM.

20. The system of claim 12, wherein each fish identifier includes at least one of a fish type, a location type, and a season.

* * * * *